Aug. 9, 1966  T. R. WILLIS  3,265,871

SATELLITE TRUE POSITION COMPUTER

Filed Oct. 22, 1962  2 Sheets-Sheet 1

INVENTOR.
THEODORE R. WILLIS

BY *Moody and Antrim*

AGENTS

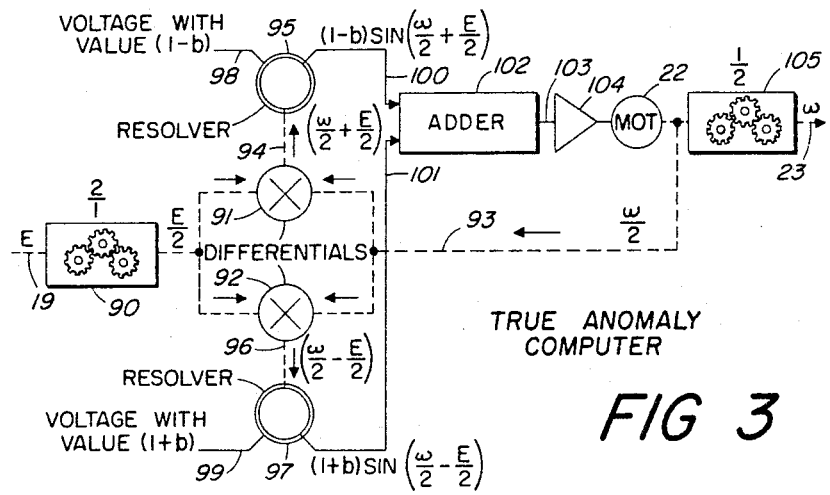
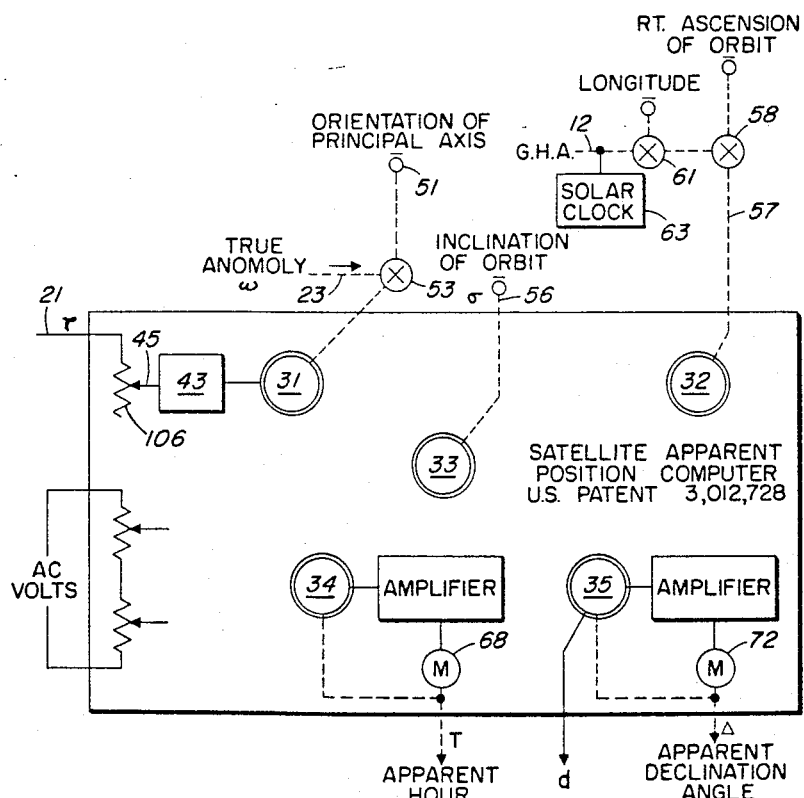

United States Patent Office 3,265,871
Patented August 9, 1966

3,265,871
SATELLITE TRUE POSITION COMPUTER
Theodore R. Willis, Plano, Tex., assignor to Collins Radio Company, Cedar Rapids, Iowa, a corporation of Iowa
Filed Oct. 22, 1962, Ser. No. 232,052
7 Claims. (Cl. 235—150.27)

This invention pertains to computer systems that aid in tracking earth satellites, and particularly pertains to systems that in response to application of the parameters of satellites' orbits, supply continuously information of the true anomalies and the radius vectors of the satellites.

The mean anomaly of a satellite, the eccentricity of its orbit, and its radius vector at perigee are computed from information supplied by spaced tracking stations. This information is introduced into a computer of this invention at a starting instant when the computer is correlated with known information to initiate computation and continuous display of true anomaly and radius vector as measured from the center of the earth. When this computed information is supplied to an apparent position computer, as described in U.S. Patent No. 3,012,728 issued to Gene R. Marner on December 12, 1961, continuous apparent hour angle, apparent declination angle, and distance to the satellite relative to any selected observational site is available to aid in tracking the satellite.

An object of the present invention is to provide a continuous display of the mean period of an earth satellite that is being tracked and to correct the display periodically.

Another object is to translate orbit parameters of satellites into continuous data for application to an apparent position computer.

Still another object is to predict the position that a satellite will have after it arises again above the horizon.

The following description and the appended claims can be more readily understood with reference to the accompanying drawings in which:

FIG. 3 is a simplified block diagram of a true anomaly computer having an input connected to the output of the eccentric anomaly computer; and FIG. 4 is a skeleton schematic representation of a satellite apparent position computer to which are applied inputs derived from the circuits shown in the previous figures.

Figure 1:
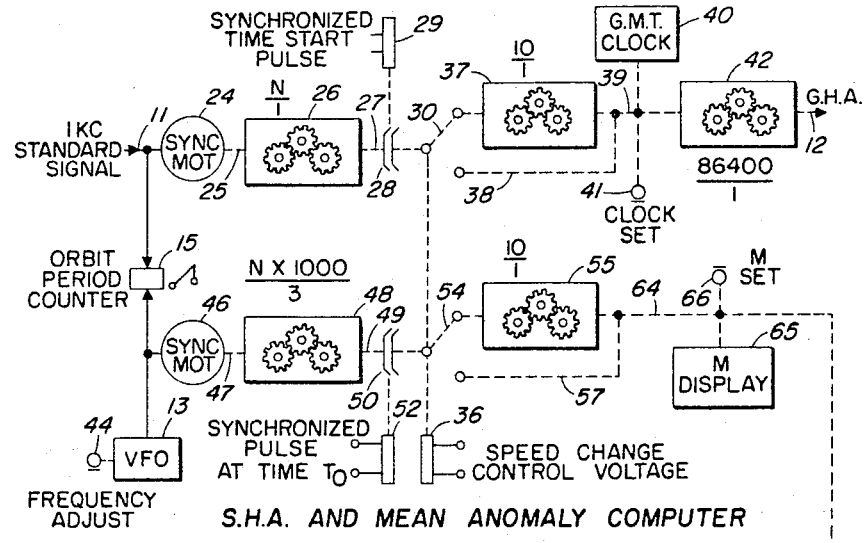
FIG. 1 is a simplified block diagram of a mean anomaly computer and source of standard Greenwich hour angle timing signal.

Briefly, FIG. 1 shows electrical and mechanical computing circuits for positioning one shaft at angles corresponding to the G.H.A. (Greenwich hour angle) and another shaft at the angle at the mean anomaly M of a satellite that is being tracked. The shaft 12 for the G.H.A. is positioned by a synchronous motor operated from power that is supplied to input 11 by a frequency standard. The shaft 14 for the mean anomaly M is positioned by a synchronous motor operated from the variable-frequency oscillator 13. A feature of the invention is the incorporation of a counter 15 to display continuously the period of the orbit of the satellite. The variable-frequency oscillator 13 supplies a base signal to the counter for determining continual successive equal intervals during which the cycles of the standard signal applied to input 11 are counted. The frequency of the variable-frequency oscillator is adjusted until the correct period is displayed on the counter and then the frequency of the oscillator determines correctly the mean anomaly M.

Figure 2:
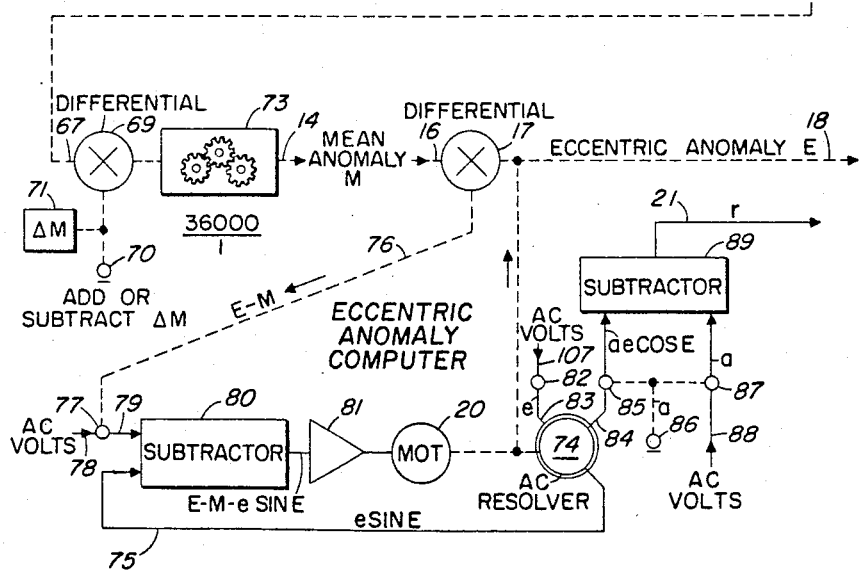
FIG. 2 is a simplified block diagram of an eccentric anomaly computer having an input connected to the output of the mean anomaly computer.

The output shaft 14 for indicating M is coupled to the input shaft 16 of differential 17 of the eccentric anomaly computer of FIG. 2. This computer supplies the eccentric anomaly E by positioning output shaft 18 at angles corresponding to E and supplies radius vector $r$ by application of voltage to conductor 21. The differential 17 and electrical computer circuits are connected to motor 20 for positioning the shaft 18. The electrical computing circuits have applied to one input a voltage proportional to the eccentricity $e$ of the orbit of the satellite and to other inputs constant voltages that are required to compute the correct radius vector $r$ that is measured from the center of the earth.

The shaft 18 that is positioned according to the eccentric anomaly is coupled to the input shaft 19 of the true anomaly computer of FIG. 3. Computing circuits control the operation of motor 22 according to both this input from shaft 18 and also applied values of functions that are derived from the eccentricity of the orbit as described below. The motor 22 rotates shaft 23 to position corresponding to the true anomaly $\omega$ of the satellite.

An output derived from each of the FIGS. 1–3 is suitable for connection to an apparent position computer as represented briefly in FIG. 4. The apparent position computer described in U.S. Patent 3,012,728 referred to above need be modified only slightly to accept these inputs. This apparent position computer comprises five resolvers 31–35. Three of these resolvers 31–33 have electrical or rotor shaft inputs corresponding to date at a particular time as derived from the ephemeris of the satellite orbit relative to the center of the earth, timing data, and geocentric coordinates that correspond to the location of an observational site. Two of the resolvers 34–35 provide outputs for indicating the direction and the distance of the satellite from the observational site. An output shaft connected to servo motor 68 and also to the rotor of resolver 34 indicates the apparent hour angle T of the satellite; an output shaft connected to servo motor 72 and also to the rotor of resolver 35 indicates the apparent declination angle $\Delta$; and the electrical output from the rotor of resolver 35 indicates the distance $d$ from the observer to the satellite.

In the patent for the satellite apparent position computer referred to above, the arm of a potentiometer that is connected to a constant source is shown connected to conductor 45 of FIG. 4 to apply alternating-current voltage, that has a value corresponding to the radius vector $r$, through buffer amplifier 43 to the stator of resolver 31. Obviously, the value of this voltage is not continuously variable and is adjusted only to predict location of a satellite in its orbit at a particular time. When the conductor 45 is disconnected from the potentiometer that supplies voltage from a constant source and is connected through a potentiometer 106 to conductor 21 of FIG. 2, voltage having a changing value corresponding to the radius vector $r$ is continuously applied to conductor 45 so that the output readings of the computer may be maintained correct for the entire period of the orbit. Potentiometer 106 is merely used as an adjustable voltage divider to connect the output $r$ of subtractor 89 of FIG. 2 as may be required for the input of the apparent position computer.

An input shaft of differential 53 that is coupled to the rotor of the resolver 31 is originally shown connected to a motor that has its rate of rotation controlled by a timing system that must be adjusted for rotating the input shaft of the differential at angles in synchronism with true anomaly $\omega$ of the satellite. When the rotor of resolver 31 is connected to the output shaft 23 of the true anomaly computer of FIG. 3 rather than to the motor as shown previously, the rotor of resolver 31 is positioned continuously according to the motion of the satellite without further adjustment. The relatively fixed angle of orientation of the principal axis of the satellite orbit relative to its node is applied as previously to the differential 53 by a manual control 51. The inclination of the orbit $\sigma$ relative to the equatorial plane continues to be shown applied manually to shaft 56 of resolver 33.

The output shaft 12 of FIG. 1 for indicating G.H.A. is connected to replace the sidereal time input previously applied to differential 61 of FIG. 4. Also the clock 63 shows solar time rather than sidereal time. When the hour-angle shaft 12 is coupled through differentials 61 and 58 to the rotor of resolver 32 the outputs of the resolver that correspond to those terrestrial coordinates perpendicular to the polar axis change continuously with the travel of the satellite. The longitude of the observer's location and the right ascension of the orbit of the satellite are applied as shaft positions to differentials 61 and 58 respectively to define fully the equatorial coordinates.

In detail, the synchronous motor 24 of FIG. 1 for driving the hour-angle shaft is connected to receive power from input 11 to which is connected a source of the 1-kilocycle standard signal. The output shaft 25 of the motor 24 is coupled to the input of a gear reducer 26, and the output shaft 27 of the gear reducer 26 is coupled to a starting clutch 28. The reducer 26 has a gear ratio as required to rotate shaft 27 at a selected rate which in the present example is 10 revolutions per second. The gear ratio is dependent upon the number of poles in the synchronous motor 24 and the gear ratios of subsequent gear assemblies. The starting clutch 28 is mechanically coupled to a solenoid 29 such that the clutch is engaged when solenoid 29 is operated. The output of clutch 28 is coupled through a speed-change mechanism through either a 10/1 gear reducer 37 or directly through shaft 38 to shaft 39. The shaft 39 is common with an indicator 40 that operates as a Greenwich mean time clock, a clock set control knob 41, and a gear reducer 42. The clock 40 may be a usual mechanical counter. The speed change mechanism 30 is coupled to a solenoid 36 that also operates the speed change mechanism for the mean anomaly portion of the computer. Usually, the clutch 28 drives through the gear reducer 37 so that the input shaft of the gear reducer 42 is rotated at the rate of one revolution per second. When the gear assemblies are selected so that the shaft 39 operates at the rate of one revolution per second, the speed reduction of the assembly 42 is 86,400/1 (the conversion factor from revolutions per second to revolutions per 24 hours) so that the rotation of output shaft 12 of the gear assembly 42 corresponds to the change in the Greenwich hour angle.

The variable frequency oscillator 13 for determining the rate of rotation of the mean anomaly shaft has its output connected to a synchronous motor 46. The oscillator has a frequency adjust knob 44 for determining the frequency of the oscillator in accordance with the period of the orbit of the satellite that is to be tracked. As described above, the output of the variable frequency oscillator 13 is connected to the counter 15 to supply a reference base for counting the cycles of the signal from the 1-kilocycle standard that is connected to input terminal 11. The shaft 47 of synchronous motor 46 is coupled to the input of gear reducer 48. The output shaft 49 of the assembly 48 is coupled to starting clutch 50. The reduction ratio of the gear assembly 48 is $N \times 1,000/3$ where N is dependent upon the number of poles of the synchronous motor 46 and to the speed ratios of the subsequent gear assemblies. Clutch 50 is operated by solenoid 52 that is responsive to operating current determined by a pulse synchronized at epoch time $T_0$ when the satellite is either at perigee or any other predetermined observable position in its orbit. The output of the clutch 50 is coupled through the speed-change mechanism 54 to either the input of gear reducer 55 or to the shaft 57. The output of reducer 55 and the shaft 57 is coupled to shaft 64 that is in common with M set control knob 66, M display counter 65, and the input 67 of differential gear assembly 69.

The M display counter 65 showns the mean time of the orbit of the satellite and the M set control knob 66 provides means for synchronizing a display indicator with time $T_0$ for a starting time at a known position of the satellite in its orbit. Differential 69 has an input that is coupled to adjustment knob 70 for adding or substracting increments of mean time $\Delta M$ as required for correcting the position of the mean anomaly output shaft. A counter or indicator 71 is also connected to the adjustment knob 70 to indicate the increment of time that is added or subtracted. The output of differential 69 is coupled to the input of gear reducer 73 and the output of the gear reducer is coupled to the output mean anomaly shaft 14. The speed ratio of the gear assembly in this example is 36,000/1 to provide a suitable frequency for the variable frequency oscillator so that the mean anomaly shaft position corresponds to the mean anomaly of the satellite.

The range of frequencies of the variable frequency oscillator 13 and the gear ratio of the gear reducer 48 have been conveniently shown so that a frequency of 2,000 cycles per second applied to the synchronous motor 46 from the oscillator corresponds to a period of 100 minutes. In this instance the frequency of the variable frequency oscillator 13 is adjusted by frequency control 44 until the counter 15 registers 100.0 to provide one revolution of the output shaft 14 during one period. The shafts for the hour angle and the mean anomaly are synchronized with the position of the satellite by operation of the starting clutch and the positions of the shafts are further corrected to eliminate errors due to initial computation and perturbation. The hour angle shaft 12 is set to a predetermined position by adjusting the clock set control 41 to attain a particular time when the tracking is to be started as displayed on the Greenwich mean time indicator 40. The clutch 28 is operated by the solenoid 29 to start driving the hour angle shaft 12 at precisely the time shown on the indicator 40. The solenoid 29 may be connected to a source of operating voltage by a starting switch (not shown) that is synchronized electronically with a timing signal.

Rotation of the mean anomaly shaft 14 is started by engagement of the clutch 50 precisely at the epoch time while the M display 65 is set to show the mean anomaly for the satellite. Ordinarily the M display will be set for zero reading and the clutch will be engaged at the perigee of the satellite in response to a synchronized pulse being applied to switching circuits for energizing solenoid 52 of the clutch 50. At the end of each period, either the M set control 66 for rotating the shaft that is connected through the M display 65 or the control 70 connected to $\Delta M$ display 71 and differential 69 may be operated to correct the position of the shaft 14 according to the period of the satellite. Through this process errors due to initial calculations and perturbations may be eliminated. When the satellite sets below the horizon, voltage can be applied to solenoid 36 for operating the speed change mechanisms 30 and 54 in the hour angle and mean anomaly drive assembly respectively. In this manner, the computers are driven at 10 times their usual rate for predicting the position that the satellite will have when it again rises above the horizon. The predicted Greenwich mean time may be used as a new epoch time at which tracking is to be resumed.

The eccentric anomaly computer of FIG. 2 solves Kepler's equations for eccentric anomaly E and in addition computes a radius vector $r$. Kepler's equation is $$E - E \sin E = M$$

where $E =$ the eccentric anomaly,
$e =$ the eccentricity of the orbit, and
$M =$ the mean anomaly.

The solution of the equation by the computer may be more readily understood by rearranging the equation to be $$E - M - E \sin E = e_1$$

where $e_1$ is a servo control voltage that ordinarily is zero

The computing elements arranged according to FIG. 2 provide a solution of this equation. The input shaft 16 for the mean anomaly is connected to one input of differential 17. Another shaft of the differential is common with the output shaft 18 and the shaft of servo motor 20. The servo motor 20 is controlled to drive output shaft 18 in synchronism with the eccentric anomaly E. The shaft of motor 20 is also connected to the rotor of the alternating current resolver 74. One rotor winding of the resolver 74 applies to conductor 75 alternating current voltage having an amplitude equal to $e \sin E$. A shaft 76 of the differential 17 has an angle of rotation $E-M$. The shaft 76 is coupled to potentiometer 77; a source of alternating current voltage is connected through conductor 78 to the potentiometer. The amplitude of the voltage applied from the source is adjusted so that the potentiometer 77 applies to conductor 79 voltage proportional to $E-M$ that has a correct amplitude relative to eccentric voltage $e$ that is applied to resolver 74. The conductors 79 and 75 for applying voltages corresponding to $E-M$ and $e \sin E$ respectively are connected to the inputs of subtractor 80. The output of subtractor 80 is applied through high gain amplifier and integrator 81 to the windings of motor 20. This voltage is proportioned to $E-M-e \sin E$ and according to the equation above is equal to zero when the shaft 18 is positioned properly to indicate eccentric anomaly E.

The resolver 74 may be either a direct-current resolver or an alternating-current resolver with appropriate voltages applied. An alternating-current resolver having a stator and a rotor with two windings similar to those shown in U.S. Patent 3,012,728 is shown so that the output voltage for the radius vector $r$ is alternating current voltage for application to the apparent position computer in that patent. The resolver 74 and two potentiometers 85 and 87 supply voltages to subtractor 89 for computing the radius vector $r$. A source of alternating-current voltage is connected through potentiometer 82 to the input conductor 83 of the stator winding of the resolver 74. The potentiometer 82 is adjusted so that the amplitude of the voltage applied to the conductor 83 is proportional to the eccentricity of the orbit of the satellite. One of the two rotor windings provides the voltage $e \sin E$ that is supplied to one input of subtractor 80 and the other winding of the rotor supplies voltage $e \cos E$ that is applied to conductor 84. Conductor 84 is connected to potentiometer 85 that supplies voltage $ae \cos E$ to subtractor 89. The shaft of the potentiometer 85 is ganged to the shaft of potentiometer 87 and the common shaft is controlled by an adjustment knob 86. The potentiometer 87 is supplied voltage from conductor 88 that is connected to a source of alternating-current voltage, and the output of the potentiometer for supplying voltage proportional to the constant "$a$" (the semi-major axis of the orbit measured from earth center) is connected to the other input of subtractor 89. The equation with radius vector $r$ as measured from the center of the earth to the satellite is $$r = a - ae \cos E$$

Therefore, the output 21 of subtractor 89 provides an alternating current voltage that is proportional to a radius vector $r$ where the radius of the earth is equal to one.

In order to control correctly the position of the eccentric anomaly shaft 18, the alternating-current voltages applied to conductor 107 of potentiometer 82 and to conductor 78 of potentiometer 77 must have values in proper ratio. These values may be determined by setting potentiometers 77 and 82 for particular values $e_1$ and by positioning the rotor of resolver 74 for a value readily determined, i.e. the rotor resolver may be set at $\pi/2$ radians. First a voltage of convenient value may be applied to conductor 78. Then in order to determine the zero position of potentiometer 77, rotate the mean anomaly input shaft 16 until the voltage on conductor 79 at the output of potentiometer 77 is zero. While the eccentric anomaly shaft 18 is maintained in a fixed position, the shaft 76 is rotated through an angle of $e_1$ radians from the position that provided zero voltage on conductor 79. The value of $e_1$ is any convenient value less than one. The control knob of potentiometer 82 should then be set for indicating the reading selected for $e_1$. While the differential shaft 76 that corresponds to $E-M$ is maintained in a fixed position, rotate the rotor of resolver 74 to obtain voltage readings that are equal on the input conductor 83 and on the output conductor 75 of the resolver. When the voltages are equal, the rotor of the resolver is positioned so that E equals $\pi/2$ so that sin E equals one. The voltages applied to conductors 78 and 107 are now correct when their relative values are adjusted so that the voltages on input conductors 75 and 79 of subtractor 80 are equal.

After the circuit values have been adjusted to obtain correct readings for eccentric anomalies, the rotors of potentiometers 85 and 87 are to be positioned correctly on their shaft and the value of alternating-current voltage is to be determined correctly for application to conductor 88 to obtain the correct voltage for $r$ on conductor 21. The eccentric anomaly shaft 18 is rotated through $\pi/2$ radians from that position required to provide equal voltages on conductors 83 and 75 so that the voltage on conductor 84 is maximum and corresponds to cos E equals one. The control knob of potentiometer 82 is now set on its calibrated point for reading $e$ equals "1." The voltage applied to conductor 84 corresponds to "$e=1$," and the voltage from the arm of potentiometer 85 corresponds to "$a$" as indicated by the position of control knob 86. While the control knob 86 is in position "0" align the rotors of potentiometers 85 and 87 for attaining zero voltage at their respective outputs. The control knob of potentiometer 86 is rotated to a position within the range of values required during subsequent use. The value of the alternating-current voltage that is applied to conductor 88 of potentiometer 87 is now correct when the voltage on conductor 21 is zero. When the unit of measurement of $r$ is the radius of the earth, the analog value of $r$ corresponds to the analog value of "$a$" that is applied from potentiometer 87 to the input of the subtractor 89.

The true anomaly computer of FIG. 3 converts eccentric anomaly E into true anomaly $\omega$ by solving the Kepler equation:

$$\tan \frac{\omega}{2} = \left(\frac{1+e}{1-e}\right)^{1/2} \tan \frac{E}{2}$$

The operation of the computer may be more readily understood by changing the form of the equation to $$(1-b) \sin \left(\frac{\omega}{2}+\frac{E}{2}\right) + (1+b) \sin \left(\frac{\omega}{2}-\frac{E}{2}\right) = 0$$

where $$b = \left(\frac{1+e}{1-e}\right)^{1/2}$$

This result is obtained as follows:

$$\tan \frac{w}{2} = b \tan \frac{E}{2}$$

$$\frac{\sin \frac{w}{2}}{\cos \frac{w}{2}} = b \frac{\sin \frac{E}{2}}{\cos \frac{E}{2}}$$

$$\sin \frac{w}{2} \cos \frac{E}{2} = b \sin \frac{E}{2} \cos \frac{w}{2}$$

since $$\sin A \cos B = \tfrac{1}{2}(\sin(A+B)+\sin(A-B))\tfrac{1}{2}\left(\sin\left(\frac{w}{2}+\frac{E}{2}\right)+\sin\left(\frac{w}{2}-\frac{E}{2}\right)\right) = \tfrac{1}{2}b\left(\sin\left(\frac{w}{2}+\frac{E}{2}\right)+\sin\left(-\frac{w}{2}+\frac{E}{2}\right)\right)\sin\left(\frac{w}{2}+\frac{E}{2}\right)-b\sin\left(\frac{w}{2}+\frac{E}{2}\right)+\sin\left(\frac{w}{2}-\frac{E}{2}\right)-b\sin\left(-\frac{w}{2}+\frac{E}{2}\right) = 0 \text{ since } \sin\left(-\frac{w}{2}+\frac{E}{2}\right) = -\sin\left(\frac{w}{2}-\frac{E}{2}\right)$$

and factoring:

$$(1-b)\sin\left(\frac{w}{2}+\frac{E}{2}\right)+\sin\left(\frac{w}{2}-\frac{E}{2}\right)+b\sin\left(\frac{w}{2}-\frac{E}{2}\right)=0$$

and $$(1-b)\sin\left(\frac{w}{2}+\frac{E}{2}\right)+(1+b)\sin\left(\frac{w}{2}-\frac{E}{2}\right)=0$$

Each of two mechanical differentials have one input coupled through a 2/1 gear reducer to the input shaft that is positioned according to the eccentric anomaly E, and another input coupled to a shaft positioned at ω/2. The outputs of the differentials operate respective resolvers that supply voltages to a servo system that positions the shaft 93 corresponding to ω/2.

The shaft 19 for eccentric anomaly E is coupled through the 2/1 gear assembly 90 to provide rotation proportional to E/2. The differential output E/2 is coupled to one input of each of the differentials 91 and 92, and shaft 93 that is positioned according to ω/2 is coupled to another input of each of the differentials. The output shaft 94 of differential 91 is now positioned according to the quantity (ω/2+E/2) while the output 96 of differential 92 is positioned according to (ω/2−E/2). Each of the shafts 94 and 96 are coupled to the rotors of respective resolvers 95 and 97 to provide output sine functions.

The input 98 to the stator of resolver 95 is connected to a source of voltage proportional to (1−b) and the input 99 to the stator of resolver 97 is connected to a source of voltage having value corresponding to (1+b). The voltages for (1−b) and (1+b) are any desirable value for application to the resolvers and the succeeding adder providing they have an exact ratio corresponding to their ratio when the value for b is derived from the equation shown above. The output 100 of resolver 95 has a voltage corresponding to (1−b) sin (ω/2+E/2) and the output 101 of the rotor of resolver 97 has a voltage corresponding to (1+b) sin (ω/2−E/2). These resolver outputs are applied with appropriate phase to separate inputs of adder 102 to provide the sum to the output conductor 103 of the adder. The output of the subtractor 102 is connected through high-gain amplifier and integrator 104 to the operating windings of servo motor 22.

The output shaft 93 of motor 22 is coupled to the inputs of the differentials 91 and 92 as described above. The servo system is the usual type that operates to rotate shaft 93 until the output 103 of the adder is equal to zero. When the variable quantities except ω/2 of the equation have been applied to the computer and when the servo system operates to its stable position in response to the output 103 of the adder 102 being zero, the position of output shaft 93 of motor 22 corresponds to ω/2. The shaft of motor 22 is connected through a 1/2 gear reducer 105 to the output shaft 23 that is now positioned according to the true anomaly ω of the satellite that is to be tracked.

The computer of this invention may be modified for different tracking purposes and still be within the scope of the following claims.

What is claimed is:

1. A satellite true position computing system comprising a mean anomaly computer, an eccentric anomaly computer, and a true anomaly computer;

said mean anomaly computer having a standard input for receiving a signal from a frequency standard, a variable frequency oscillator, a counter connected to said standard input and to said variable frequency oscillator to measure the ratio between the frequency of said frequency standard and the frequency of said variable frequency oscillator, an hour-angle shaft, first synchronous motor means responsive to the application of signal from said standard input to rotate said hour angle shaft at rate corresponding to the rate of change of the hour angle, means for synchronizing the position of the shaft with a time standard to indicate the correct hour angle, a mean-anomaly indicating shaft, second synchronous motor means responsive to the application of signal from said variable frequency oscillator to rotate said mean-anomaly indicating shaft at a rate corresponding to the rate of change of the mean anomaly of a satellite as determined by the adjustment of the frequency of said variable frequency oscillator, engaging means coupled between said second synchronous motor and said mean-anomaly indicating shaft for synchronizing the position of said mean-anomaly indicating shaft with the mean anomaly of the satellite.

said eccentric anomaly computer having an input shaft coupled to said mean-anomaly indicating shaft, an output eccentric-anomaly indicating shaft, means for establishing an eccentric voltage proportional to the eccentricity of the orbit of the satellite, means for establishing a difference voltage proportional to the difference in position of said input shaft and said mean-anomaly indicating shaft, servo means responsive to application of said eccentric voltage and said difference voltage for positioning said mean-anomaly indicating shaft to indicate the mean anomaly of said satellite;

said true anomaly computer having an input shaft coupled to said eccentric-anomaly indicating shaft, a true-anomaly indicating shaft, means for establishing first and second voltages that are functions of the eccentricity of the orbit of said satellite, computing and servo means coupled to said last mentioned input shaft and responsive to the application of said last mentioned voltages for positioning said true-anomaly indicating shaft such that its angular position corresponds to the true anomaly of the satellite.

2. A computing system according to claim 1 further comprising, a radius output resolving means coupled to said eccentric-anomaly indicating shaft and responsive to application of said eccentric voltage to apply to said radius output a voltage having an amplitude proportional to the radius vector extending from an observational site to the satellite.

3. A computing system according to claim 1 further comprising, a counter for displaying the mean anomaly of the satellite, said last mentioned counter being coupled to said second synchronous motor means to be driven in synchronism with said mean-anomaly indicating shaft.

4. A computing system according to claim 1 further comprising, a differential gear system coupled between said second synchronous motor means and said mean-anomaly indicating shaft, adjustment and indicating means coupled to said differential for correcting exactly the position of said mean-anomaly indicating shaft by predetermined increments of rotation.

5. A computing system according to claim 1, said mean anomaly computer further comprising first and second speed change mechanisms, said first speed change mechanism coupling said first synchronous motor means to said hour angle shaft, said second speed change mechanism coupling said second synchronous motor to said means anomaly indicating shaft, and speed change operating means operable to change the driving ratios of said first and second speed change mechanisms to increase the speed of rotation of said hour angle shaft and of said mean anomaly indicating shaft for predicting the position of a satellite.

6. A computing system according to claim 1 in which said computing and servo means for said true anomaly computer further comprises, first and second differentials and respective first and second resolvers, each of said resolvers having a rotor coupled to the output of the respective one of said differentials, each of said differentials having an input coupled to said input shaft of said true anomaly computer and another input coupled to said true-anomaly indicating shaft, said first differential rotating the rotor of said first resolver at a rate proportional to the sum of the rates of rotation applied to said inputs of said first differential, said second differential rotating the rotor of said second resolver at a rate of rotation proportional to the difference of the rates of rotation applied to the inputs of said second differential, said first voltage that is a function of eccentricity being applied to the input of said first resolver, said second voltage that is a function of eccentricity being applied to the input of said second resolver, an adder having an input connected to an output of said first resolver and another input connected to an output of said second resolver, and a servo motor electrically connected to output of said adder and coupled to said true-anomaly indicating shaft to position said true-anomaly indicating shaft.

7. A satellite true position computing system adaptable for connection to a satellite apparent position computer, comprising a mean anomaly computer, an eccentric anomaly computer, and a true anomaly computer;

said mean anomaly computer having a standard input for receiving a signal from a frequency standard, a stabilized variable-frequency oscillator, an orbit period counter, said counter having a first input connected to said standard input and a second input connected to the signal output of said variable-frequency oscillator, said counter displaying the period of a satellite being tracked as a function of the ratio of the frequency of the signal applied to said standard input to the frequency of the signal of said variable-frequency oscillator, an hour-angle control shaft, means responsive to the application of signal from said standard input to rotate said shaft in synchronism with a time standard at a rate corresponding to the Greenwich hour angle, a mean-anomaly display counter, a mean-anomaly indicating shaft, means responsive to the application of signal from said variable-frequency oscillator to rotate said mean anomaly indicating shaft and to operate said display counter in accordance with the mean anomaly of a satellite being tracked;

said eccentric anomaly computer having an input shaft coupled to said mean-anomaly indicating shaft, an output eccentric-anomaly indicating shaft, means for establishing a source of eccentric voltage having a value proportional to the eccentricity of the orbit of the satellite being tracked, eccentric control means coupled to said input shaft and to said mean-anomaly shaft and connected to said source of eccentric voltage, said eccentric control means being responsive to the difference in rotative position of said input shaft and the rotative position of said eccentric anomaly indicating shaft and also to the value of said eccentric voltage to control the rotation of said eccentric anomaly indicating shaft to indicate the true anomaly of the orbit of said satellite, a radius output, means for establishing constant voltage corresponding to the known radius at a predetermined position of the satellite, and means coupled to said eccentric anomaly indicating shaft and connected to said source of constant voltage and to said source of eccentric voltage for computing output voltage having a changing value corresponding to the changing radius vector of said satellite for application to said radius output;

said true anomaly computer having an input shaft coupled to said eccentric-anomaly indicating shaft, an output true-anomaly indicating shaft, means for establishing first and second voltages having a ratio as a function of said eccentricity, resolving means coupled to said last mentioned input shaft and to said true-anomaly indicating shaft, said resolving means being operated as a function of the difference in rotation of said last mentioned input shaft and rotation of said true-anomaly indicating shaft and responsive to the application of said first and second voltages to control the positioning of said true-anomaly indicating shaft;

said hour angle control shaft, said radius output, and said true-anomaly indicating shaft being adaptable for connection to said satellite apparent position computer having other inputs for orientation of principal axis, inclination of orbit, and right ascension of orbit to compute continuously the apparent hour angle, the apparent declination angle, and the distance of said satellite.

References Cited by the Examiner

UNITED STATES PATENTS

| | | |
|---|---|---|
| 2,857,672 | 10/1958 | McCoy. |
| 2,989,233 | 6/1961 | Schroeder et al. |
| 3,012,728 | 12/1961 | Marner. |
| 3,135,861 | 6/1964 | Burggren et al. ____ 235—193 X |

MALCOLM A. MORRISON, *Primary Examiner.*

I. KESCHNER, *Assistant Examiner.*